US006869098B2

(12) United States Patent
Tomchak et al.

(10) Patent No.: US 6,869,098 B2
(45) Date of Patent: Mar. 22, 2005

(54) COLLAPSIBLE WHEELBARROW AND ASSOCIATED METHOD

(75) Inventors: Michael J. Tomchak, Harrisburg, PA (US); Barry R. Albert, Dillsburg, PA (US); Mike Lupey, Waterfall, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 0 days.

(21) Appl. No.: 10/737,047

(22) Filed: Dec. 16, 2003

(65) Prior Publication Data

US 2004/0124612 A1 Jul. 1, 2004

Related U.S. Application Data

(62) Division of application No. 10/216,071, filed on Aug. 9, 2002.

(51) Int. Cl.[7] ............................................... B62B 1/00
(52) U.S. Cl. .................. 280/653; 280/47.31; 280/47.33
(58) Field of Search ............................ 280/653, 47.31, 280/652, 654, 764.1, 47.2, 47.3, 765.1, 47.315, 47.32, 47.33, 47.26, 47.27, 763.1; D34/12–27; 248/127, 136, 96, 97, 99, 395, 398, 396

(56) References Cited

U.S. PATENT DOCUMENTS

| 274,781 A | | 3/1883 | Jacobs |
| 290,156 A | * | 12/1883 | Whitney .................. 280/47.31 |
| 698,930 A | * | 4/1902 | Garver et al. ............... 280/47.3 |
| 872,926 A | * | 12/1907 | Gates ...................... 280/47.31 |
| 1,744,156 A | * | 1/1930 | Brown ........................ 301/5.1 |
| 2,037,222 A | | 4/1936 | Farrar |
| 2,494,199 A | * | 1/1950 | Provitola et al. ........... 280/653 |
| 2,593,944 A | * | 4/1952 | Walters, Jr. et al. ........ 172/246 |
| 2,727,751 A | * | 12/1955 | Souris ........................ 280/645 |
| 3,258,275 A | * | 6/1966 | Schaefer et al. ........... 280/47.2 |
| 3,315,930 A | | 4/1967 | Cota |
| 3,552,760 A | | 1/1971 | Sine |
| 3,722,904 A | * | 3/1973 | Puckett ........................ 280/653 |
| 3,826,511 A | * | 7/1974 | Frank .......................... 280/653 |
| 4,190,260 A | | 2/1980 | Pearce |
| 4,223,860 A | | 9/1980 | Prest |
| 4,401,313 A | * | 8/1983 | Filas ........................ 280/47.31 |
| 5,040,807 A | * | 8/1991 | Snover ......................... 280/30 |
| 5,121,970 A | | 6/1992 | Andersen |
| 5,152,485 A | | 10/1992 | Follick |
| 5,372,376 A | | 12/1994 | Pharaoh |
| 5,788,260 A | | 8/1998 | Huang |
| 5,908,202 A | | 6/1999 | Leger et al. |
| 5,915,706 A | * | 6/1999 | Mosley .................... 280/47.26 |
| 5,924,708 A | * | 7/1999 | Bisaillon et al. ......... 280/47.26 |
| 6,017,053 A | * | 1/2000 | Leger et al. ................ 280/653 |
| 6,186,523 B1 | | 2/2001 | Aielli |
| 6,220,622 B1 | * | 4/2001 | Garcia ......................... 280/653 |
| 6,328,331 B1 | | 12/2001 | McEnteggart |
| D455,535 S | | 4/2002 | Kamphuis |
| 6,390,496 B1 | * | 5/2002 | Eicher ......................... 280/653 |
| 6,446,989 B1 | | 9/2002 | Intengan |
| 6,508,478 B1 | | 1/2003 | Ortez |
| 2002/0113389 A1 | | 8/2002 | Robinson |
| 2004/0026898 A1 | * | 2/2004 | Tomchak et al. ........... 280/653 |
| 2004/0036259 A1 | * | 2/2004 | Tomchak et al. ........... 280/653 |
| 2004/0124612 A1 | * | 7/2004 | Tomchak et al. ........... 280/653 |

FOREIGN PATENT DOCUMENTS

GB      2 339 741 A      2/2000

* cited by examiner

Primary Examiner—Christopher P. Ellis
Assistant Examiner—J. Allen Shriver
(74) Attorney, Agent, or Firm—Eckert Seamans Cherin & Mellott, LLC

(57) ABSTRACT

An improved wheelbarrow includes a pair of legs that are each configured as four-bar linkages and are collapsible. The wheelbarrow includes a frame assembly, a wheel, a tray, and a pair of handles. The frame assembly can be assembled by the manufacturer. The wheelbarrow can then be assembled by the retailer or the consumer by simply attaching the wheel, the tray, and the handles to the frame assembly.

16 Claims, 13 Drawing Sheets

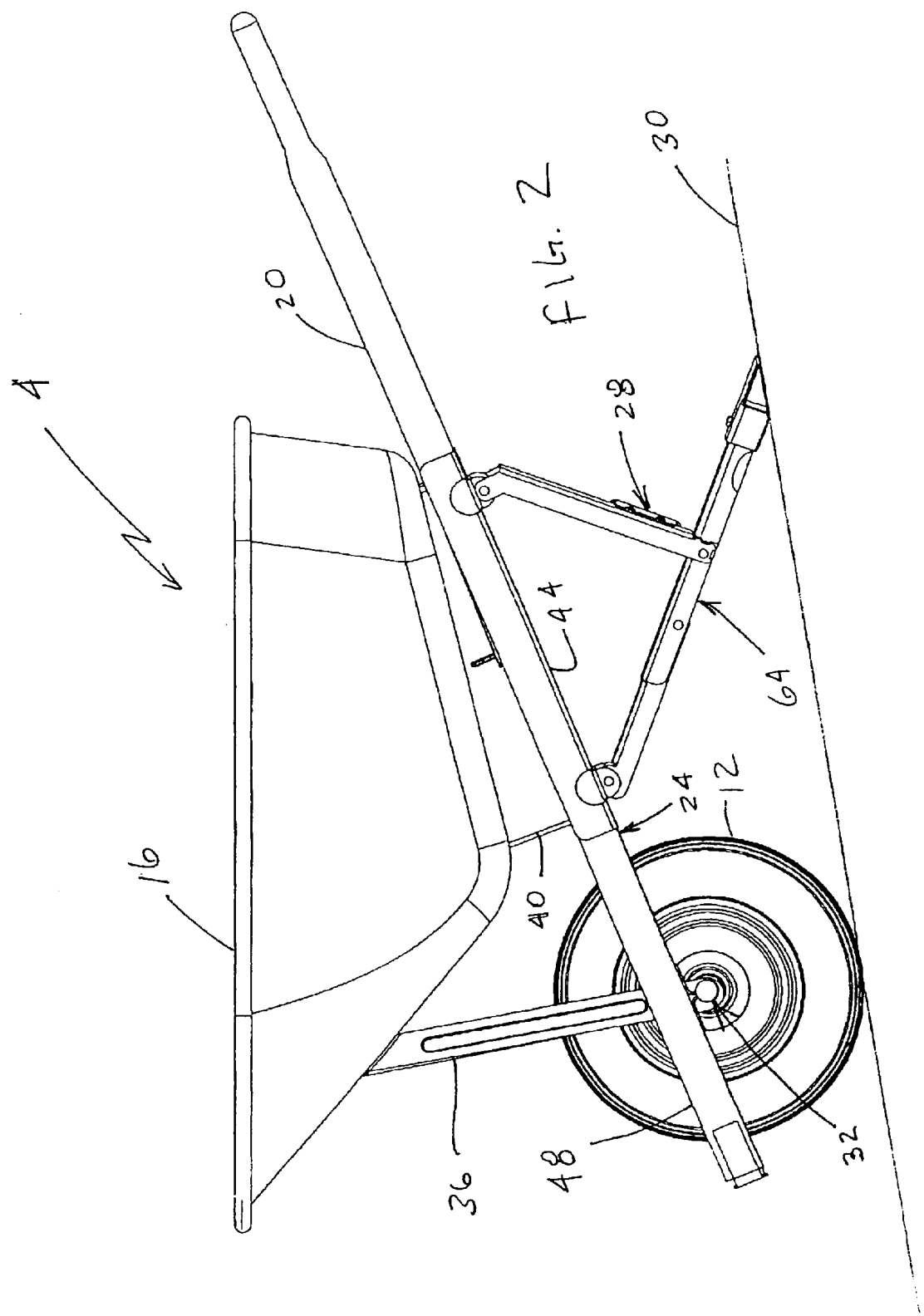

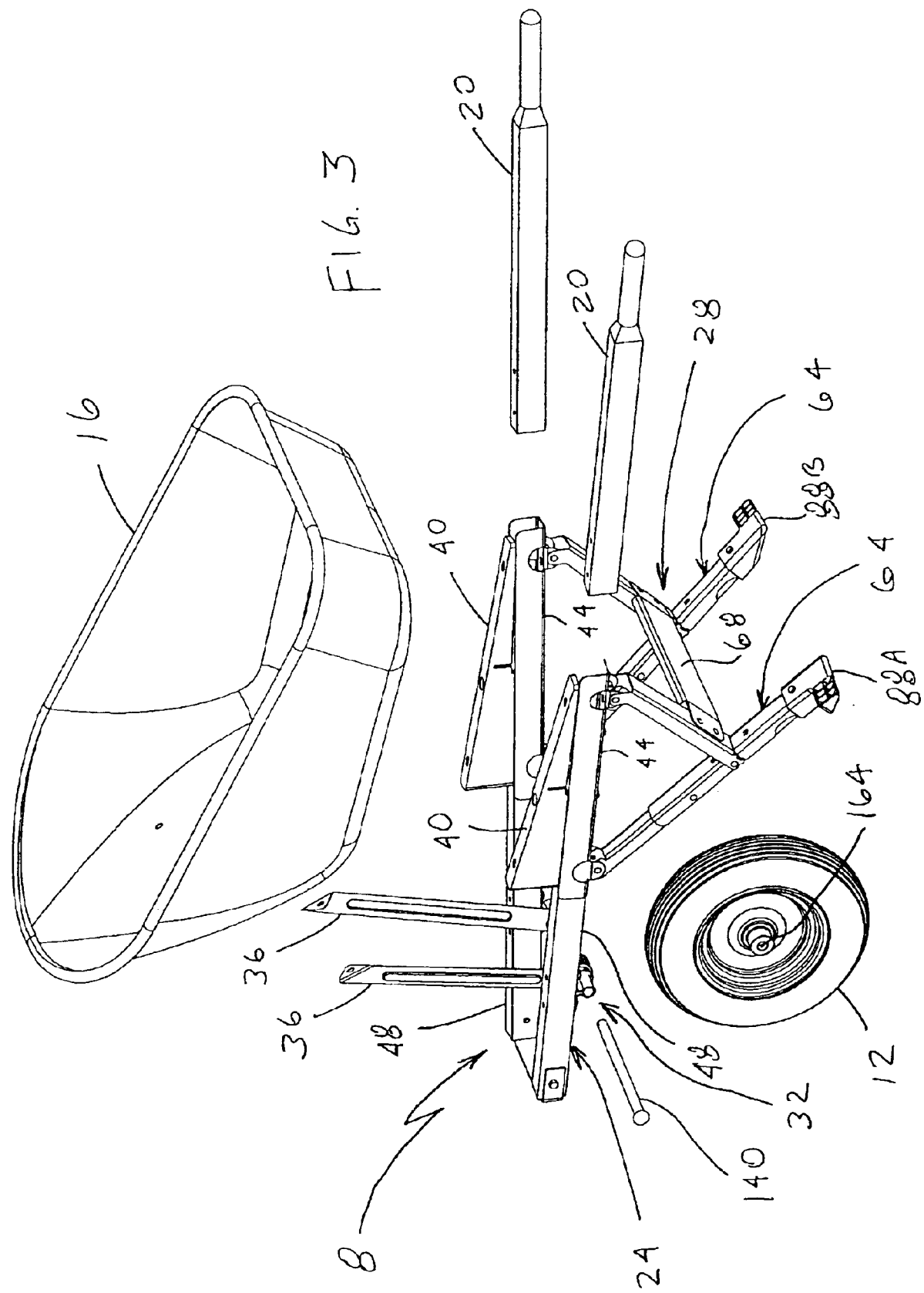

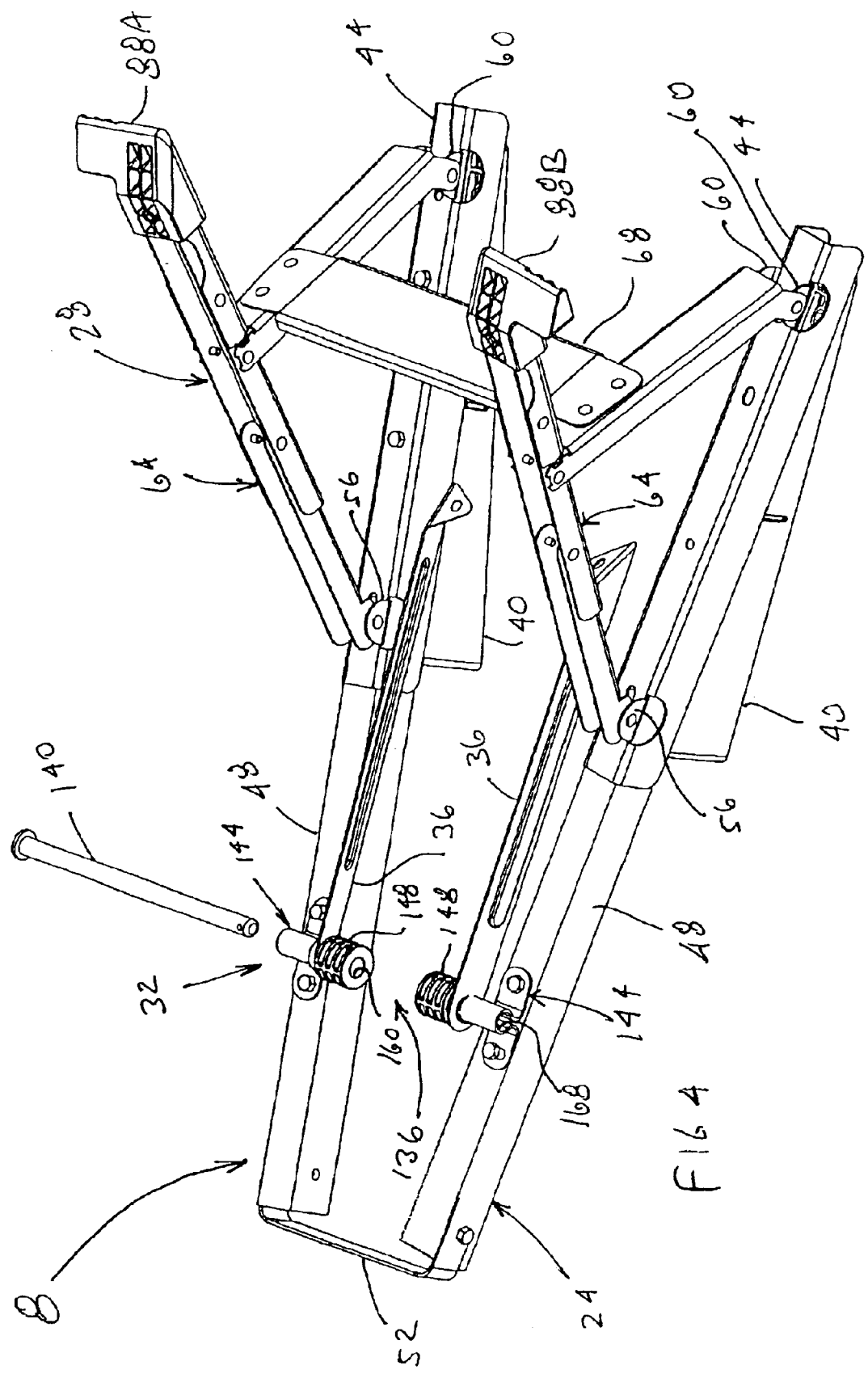

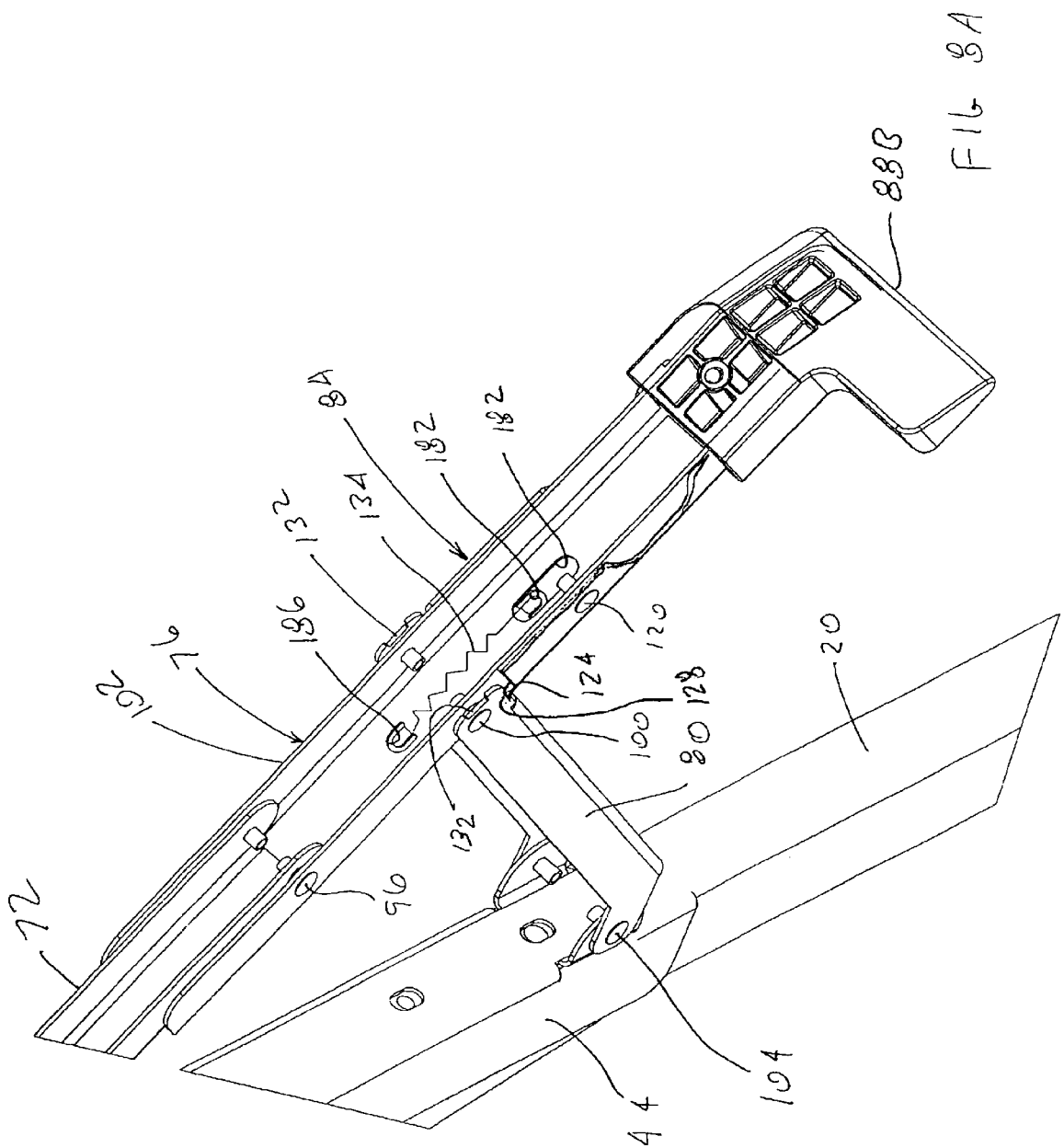

COLLAPSIBLE WHEELBARROW AND ASSOCIATED METHOD

CROSS-REFERENCE TO RELATED APPLICATION

This application is a divisional application of commonly assigned U.S. patent application Ser. No. 10/216,071, filed Aug. 9,2002, and entitled "COLLAPSIBLE WHEELBARROW AND ASSOCIATED METHOD", the disclosures of which are incorporated herein by reference.

BACKGROUND OF THE INVENTION

1. Field of the Invention

The present invention relates generally to wheelbarrows and, more particularly, to a wheelbarrow having collapsible legs and also to a wheelbarrow that can be assembled relatively quickly.

2. Description of the Related Art

Wheelbarrows of numerous different configurations are known in the relevant art. Wheelbarrows can be generally stated as including a tray that can receive and carry a quantity of material therein, a wheel that supports the tray and permits the tray to be moved with respect to a surface such as the grade, and at least a first handle that permits a user to apply forces to drive the tray and the wheel to desired locations. Wheelbarrows typically also include one or more legs that can engage the surface on which the wheelbarrow is disposed to help support the tray and to retain the wheelbarrow in a given position on the surface.

A wheelbarrow with a wheel and one or more legs typically occupies a large region of space because the wheel and legs typically protrude downwardly from the tray at opposite ends of the tray. Such wheelbarrows thus require a large space for storage, and it is known that storage space within sheds, garages, and the like is limited. It is thus desired to provide a wheelbarrow that can be readily collapsed in some fashion, that is structurally sound, and that is substantially as functional as a conventional non-collapsible wheelbarrow.

While wheelbarrows are often configured out of relatively simple components, wheelbarrows typically take a substantial amount of time to assemble when new due to the large number of components. It is also preferred to provide an improved method of assembling a wheelbarrow that takes relatively less time than the assembly of previously known wheelbarrows.

SUMMARY OF THE INVENTION

An improved wheelbarrow in accordance with the present invention meets these needs and other needs. The improved wheelbarrow includes a pair of legs that are each configured as four-bar linkages and are collapsible. The wheelbarrow includes a frame assembly, a wheel, a tray, and a pair of handles. The frame assembly can be assembled by the manufacturer. The wheelbarrow can then be assembled by the retailer or the consumer by simply attaching the wheel, the tray, and the handles to the frame assembly.

Accordingly, an aspect of the present invention is to provide an improved wheelbarrow that is at least partially collapsible.

Another aspect of the present invention is to provide an improved wheelbarrow that can be quickly assembled.

Another aspect of the present invention is to provide an improved wheelbarrow that occupies relatively less space during storage than other known wheelbarrows.

Another aspect of the present invention is to provide an improved wheelbarrow that has collapsible legs yet is able to carry and support heavy loads.

Another aspect of the present invention is to provide an improved wheelbarrow having collapsible legs that can be quickly and easily collapsed by a user.

Another aspect of the present invention is to provide an improved wheelbarrow having collapsible legs that can be locked in either the extended position or the retracted position.

These and other aspects of the present invention are achieved by providing an improved a wheelbarrow that can be disposed on a surface, in which the general nature of the wheelbarrow can be stated as including a frame, at least a first wheel mounted on the frame, and a support, the support including at least a first leg mounted on the frame, the at least first leg including a first member, a second member, and a third member, the first and third members each being pivotably mounted on the frame, the second member being pivotably connected with and pivotable with respect to each of the first and third members, the at least first leg being movable between an extended position and a retracted position.

The first, second, and third members may be oriented substantially parallel with or be disposed generally flush with a portion of the frame when the at least first leg is in the retracted position. The at least first leg may also include a lock that releasably retains the at least first leg in at least one of the extended and retracted positions. The lock may extend between the second member and one of the first and second members.

Another aspect of the present invention is to provide a wheelbarrow that can be disposed on a surface, in which the general nature of the wheelbarrow can be stated as including a frame, at least a first wheel mounted on the frame, and at least a first leg mounted on the frame, the at least first leg being movable between an extended position and a retracted position, and the at least first leg cooperating with the frame to function as a four-bar linkage.

Another aspect of the present invention is to provide a collapsible support for a device, the support being structured to retain the device in a given position with respect to a surface, in which the general nature of the support can be stated as including a first member, a second member, a third member, and a lock extending between the second member and one of the first and third members, the support being movable between an extended position and a retracted position, the lock releasably retaining the support in at least one of the extended position and the retracted position, the second member being pivotably connected with and pivotable with respect to the first and third members, the second member being engageable with the surface to retain the device in the given position with respect to the surface when the support is in the extended position, the first and third members each being structured to be mounted on the device.

Another aspect of the present invention is to provide a device structured to be disposed against a surface, in which the general nature of the device can be stated as including a frame, a support mounted on the frame, the support including a first member, a second member, and a third member, the first and third members each being pivotably mounted on the frame, the second member being pivotably connected with and pivotable with respect to each of the first and third members, the support being movable between an extended position and a retracted position, the second member being engageable with the surface to retain the device in the given position with respect to the surface when the support is in the extended position.

Another aspect of the present invention is to provide a kit from which a wheelbarrow can be assembled, in which the general nature of the kit can be stated as including a frame subassembly, the frame subassembly including a frame, an axle apparatus, at least a first leg, and at least a first tray brace connected together as an assembled unit, the at least first tray brace being pivotable with respect to the frame, a wheel mountable to the frame subassembly, a tray mountable to the frame subassembly, and at least a first handle mountable to the frame subassembly.

Another aspect of the present invention is to provide a method of assembling a wheelbarrow from a kit, in which the general nature of the method can be stated as including mounting a tray to a frame subassembly, mounting a wheel to the frame subassembly, and mounting a handle to the frame subassembly.

BRIEF DESCRIPTION OF THE DRAWINGS

A further understanding of the invention can be gained from the following description of the preferred embodiments when read in conjunction with the accompanying drawings in which:

FIG. 2 is a side elevational view of the wheelbarrow disposed on a surface;

FIG. 3 is an exploded perspective view of the wheelbarrow with the legs in a retracted position;

FIG. 4 is a bottom perspective view of a portion of the wheelbarrow;

FIG. 8A is another perspective view of a portion of the underside of one of the legs;

Similar numerals refer to similar parts throughout the specification.

DESCRIPTION OF THE PREFERRED EMBODIMENT

Figure 1:
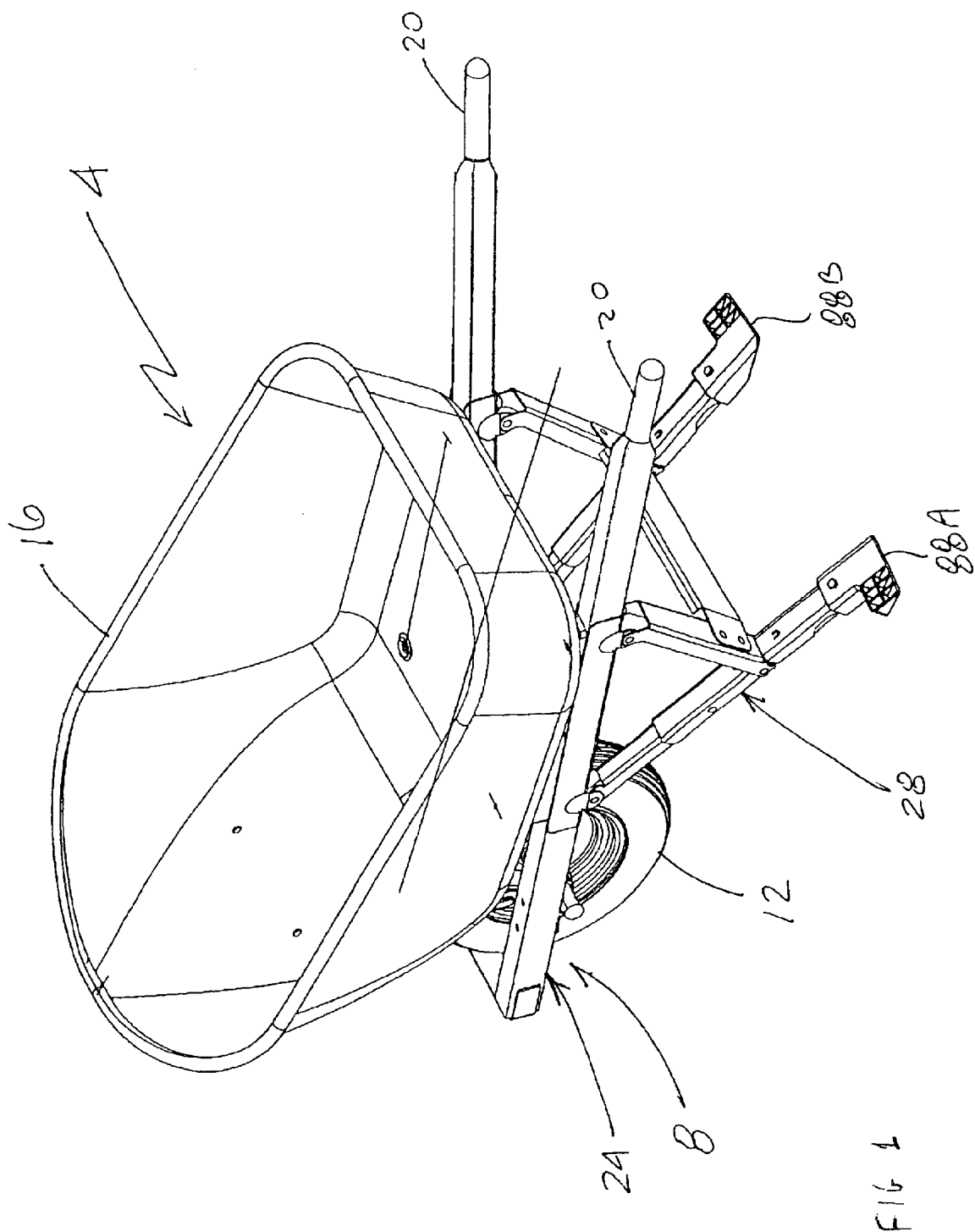
FIG. 1 is a side perspective view of an improved wheelbarrow in accordance with the present invention and depicting a pair of legs of the wheelbarrow being in an extended position.
Figure 3A:
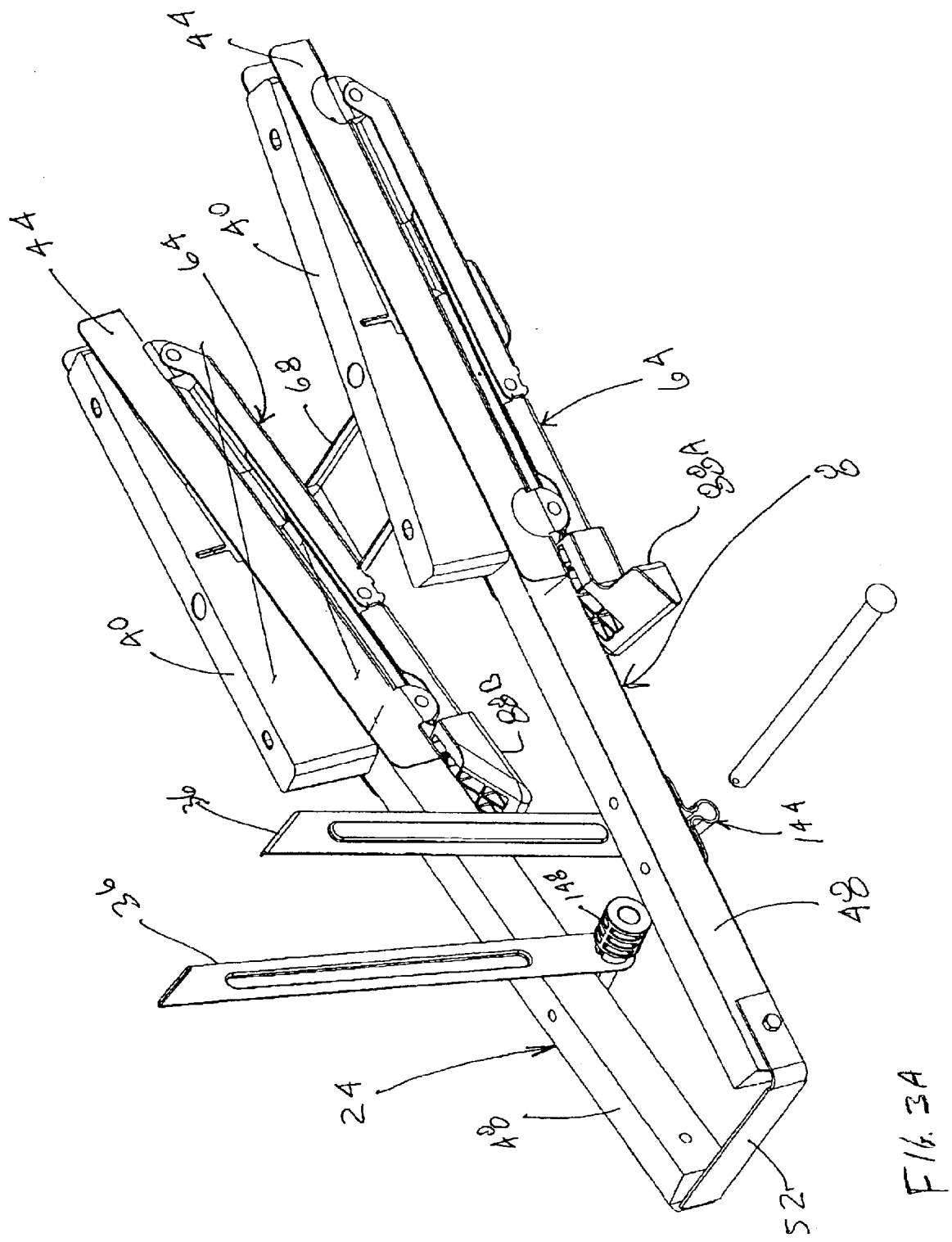
FIG. 3A is a perspective view of a portion of the wheelbarrow and depicting the pair of legs in the retracted position.

An improved wheelbarrow 4 in accordance with the present invention is indicated generally in FIGS. 1–3. The wheelbarrow 4 is advantageously configured to be collapsible, as is indicated generally in FIG. 3A, in order to occupy less space than when the wheelbarrow 4 is in a non-collapsed position, as is indicated generally in FIG. 1. The wheelbarrow 4 also is advantageously configured to be quickly assembled during initial assembly of the wheelbarrow 4 when new.

As can be seen from FIG. 3, the wheelbarrow 4 includes a frame subassembly 8, a wheel 12, a tray 16, and a pair of handles 20. The wheel 12, the tray 16, and the handles 20 are mountable to the frame subassembly 8 in order to form the assembled wheelbarrow 4. The frame assembly 8 can be advantageously manufactured and delivered to a retailer or a customer in an assembled condition as is depicted generally in FIG. 3. In order to construct the wheelbarrow 4, the wheel 12, the tray 16, and the handles 20 are mounted to the frame subassembly 8. The frame subassembly 8, the wheel 12, the tray 16, and the handles 20 can be sold together as a kit including appropriate fasteners (not shown) which can be easily and quickly assembled by the retailer or the customer since the frame subassembly 8 is delivered in an assembled condition.

The frame subassembly 8 includes a frame 24, a support 28, an axle apparatus 32, a pair of tray braces 36, and pair of risers 40. The frame 24 serves as a central structure to which many of the components of the wheelbarrow 4 are attached. The support 28 is movable between an extended position, as is shown in FIG. 1, and a retracted position, as is shown in FIG. 3A. The support 28 is configured to retain the wheelbarrow 4 in a given position or orientation with respect to a surface 30 (FIG. 2) upon which the wheelbarrow 4 is disposed. As used herein, the expression "surface" refers to a face of any type of structure, whether natural or artificial, and is not limited to planar or horizontal faces, and thus can include, for instance, a surface of the earth, a surface of a man-made structure such as a floor, and any other type of face of a structure.

The axle apparatus 32 is disposed on the frame 24 and is configured to receive the wheel 12 thereon in order to mount the wheel 12 to the frame 24. The tray braces 36 are pivotably mounted on the axle apparatus 32 and are configured to extend from the axle apparatus 32 to the tray 16 in order to securely mount the tray 16 to the frame subassembly 8. The risers 40 are mounted on the frame 24 and are configured to orient the tray 16 at specific angles with respect to the support 28 and/or the horizontal when the support 28 is engaged with the surface 30 and when the handles 20 are being carried by a user of the wheelbarrow 4, all in a known fashion.

As is best shown in FIG. 4, the frame 24 includes a pair of central frame members 44, a pair of frontal frame members 48, and a kicker 52 extending between the frontal frame members 48. The central frame members 44 can be U-shaped channels of metal, such as steel, although other materials and configurations are possible without departing from the concept of the present invention. The frontal frame members 48 are substantially rigid and may be manufactured out of wood or other sufficiently rigid structure to which the axle apparatus 32 can be attached. Alternatively, the central and frontal frame members 44 and 48 and the handles 20 may be of tubular materials. The frontal frame members 48 are at least partially received within the central frame members 44, whereby the frontal frame members 48 are connected with the central frame members 44, although other attachment methodologies may be employed. The kicker 52 contributes to the rigidity of the frame 24 and serves as a foot upon which the wheelbarrow 4 can be supported and pivoted when the contents of the tray 16 are being dumped out of the tray 16.

Each central frame member 44 includes a pair of forward ears 56 and a pair of rearward ears 60, with the forward and rearward ears 56 and 60 protruding in a generally downward direction (from the perspective of FIG. 2). The forward and rearward ears 56 and 60 may be formed out of a portion of the webs of the central frame members 44, or could be formed as separate structures such as brackets that are attached to the central frame members 44. Such a configuration might be particularly appropriate if the central and frontal frame members 44 and 48 and the handles 20 were replaced with a pair of elongated members that form both the handles and part of the frame. The support 28 is mounted on the forward and rearward ears 56 and 60.

The support 28 includes a pair of legs 64 and a cross brace 68. The legs 64 are each substantially identical to one another. The legs 64 are movable between an extended position (FIG. 1) and a retracted position (FIG. 3A) and are engageable with the surface 30 (FIG. 2) to retain the wheelbarrow 4 in a given orientation or position with respect to the surface 30.

The cross brace 68 extends between the legs 64 and causes the legs 64 to move simultaneously when the legs 64 are moving between the extended and retracted positions. One of the legs 64 is mounted on one of the central frame members 44, and the other of the legs 64 is mounted on the other of the central frame members 44, although the legs 64 could be mounted to the frame 24 in other fashions. The cross brace 68 contributes to the rigidity of the frame 24 by resisting relative motion between the legs 64.

Figure 5:
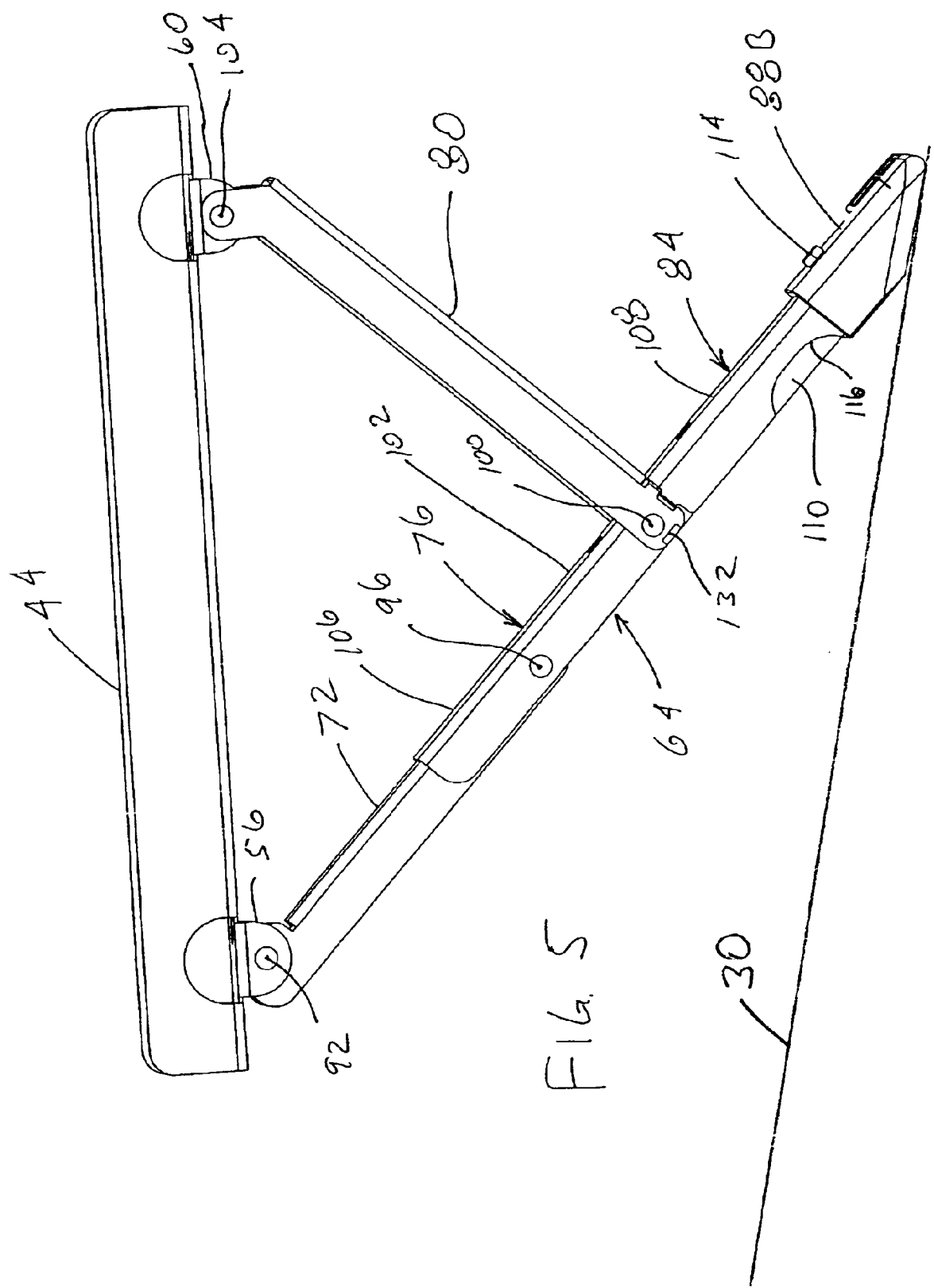
FIG. 5 is an enlarged view of one of the legs of the wheelbarrow depicted in the extended position.

As is best shown in FIG. 5, each leg 64 includes a first member 72, a second member 76, a third member 80, a lock 84, and a shoe 88A or 88B. The first, second, and third member 72, 76, and 80 are, in the depicted embodiment, each generally U-shaped in cross section whereby each includes an interior channel defined generally between the three webs of the U-shaped section. Since the legs 64 are substantially identical, the specific details thereof will be described with respect to only one of the legs 64, it being understood that the same details are equally applicable to the other of the legs 64.

The first member 72 is pivotably mounted on the forward ears, 56 at a first pivot point 92. The first member 72 and a second member 76 are pivotably connected with one another at a second pivot point 96 which is at an opposite end of the first member 72 from the first pivot point 92. The second member 76 is pivotably connected with the third member 80 at a third pivot point 100. The third member 80 is pivotably connected with the rearward ears 60 at a fourth pivot point 104.

The shoe 88A or 88B is fixedly mounted on an end of the second member 76 with a fastener 114, such as a bolt or other appropriate fastener. The shoes 88A and 88B of the two legs 64 are substantially mirror images of one another and constitute substantially the only difference between the two legs 64.

Figure 6:
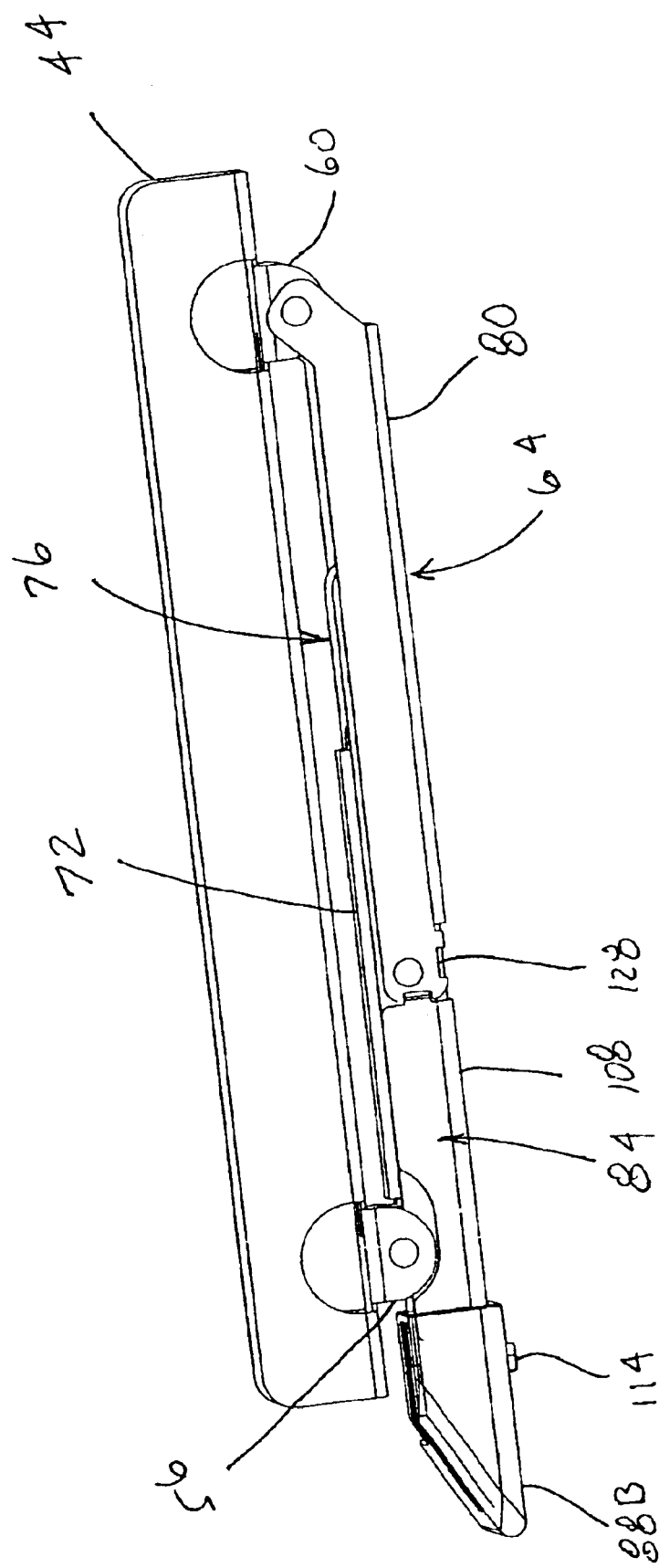
FIG. 6 a view similar to FIG. 5, except depicting the leg in the retracted position.
Figure 7:
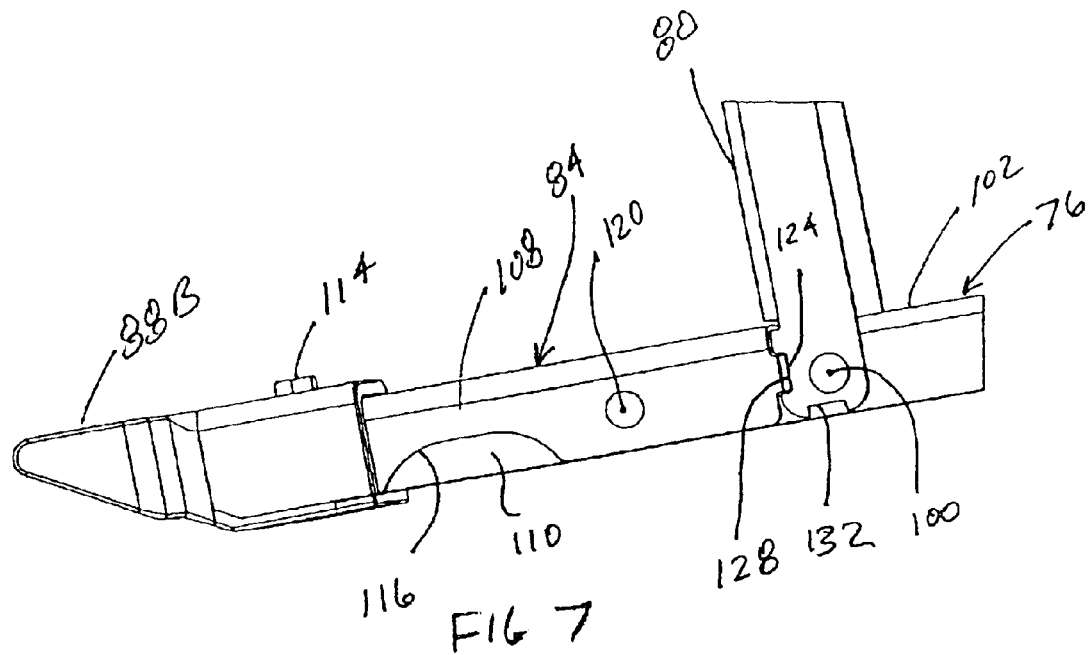
FIG. 7 is an enlarged view of a portion of the leg.

The lock 84 is slidably disposed on the second member 76 and is formed with a pair of undercuts 116 (FIG. 5) that can accommodate the forward ears 56 therein when the leg 64 is in the retracted position, as can be seen in FIG. 6. A portion of the second member 76 can be observed in FIG. 5 behind the undercut 116 thereof.

As can be seen from FIG. 5, the second member 76 can be stated as including a central portion 102 extending generally between the second and third pivot points 96 and 100, a first protruding portion extending from the second pivot 96 away from the central portion 102, and a second protruding portion 110 extending between the third pivot point 100 and the shoe 88A or 88B. The lock 84 is slidably disposed on the second protruding portion 110. When the leg 64 is in the extended position, the first protruding portion 106 overlaps and engages the first member 72. When the shoe 88A or 88B is disposed against the surface 30, the first protruding portion 106 resists buckling of the leg 64 due to a heavy load carried in the tray 16. The first protruding portion 106 thus serves as a buttress against the first member 72 in order to enhance the strength of the leg 64 when in the extended position to resist failure of the leg 64 due to a load carried in the tray 16.

The central frame member 44 and the first, second, and third members 72, 76, and 80 together work as a four-bar linkage for movement between the extended and retracted positions. As used herein, the expression "four-bar linkage" shall refer generally to any type of linkage that operates substantially within a plane and that includes four links that are pivotably connected end-to-end in a closed loop. In this regard, therefore, various "links" may be defined generally between pivot points.

Accordingly, the first, second, and third members 72, 76, and 80 pivot with respect to one another and with respect to the central frame member 44 when moving between the extended and retracted positions. The first, second, third, and fourth pivot points 92, 96, 100, and 104 accordingly can be configured with heavy connection structures such as rivets, bolts and nuts, pins, and the like to enhance the strength of the leg 64.

In moving the leg 64 from the extended to the retracted positions, it can be understood that the first member 72 pivots in a counter-clockwise direction from the perspective of FIG. 5 and that the second and third members 76 and 80 pivot in a clockwise direction with respect to FIG. 5. The tray 16 need not be detached from the structures to which it is mounted.

When the leg 64 is in the retracted position, a portion of the first member 72 is received in the interior channel of the second member 76, and a portion of the second member 76 is received in the interior channel of the third member 80. It is thus understood that the first member 72 is relatively narrower than the second member 76 which is, in turn, relatively narrower than the third member 80. In this regard, it can be seen that the first member 72 is disposed between the forward ears 56 while the third member 80 is mounted to the faces of the rearward ears 60 that face away from one another. Such variation in the widths of the first, second, and third members 72, 76, and 80 facilitates the collapsing of the leg 64 into itself when the leg 64 is in the retracted position.

In the retracted position, the third member 80 is the structure that protrudes substantially the greatest distance from the central frame member 44, and such protruding distance is extremely small compared with the size of the leg 64 in the extended position. This is due, at least in part, to the ability of the first, second, and third members 72, 76, and 80 to be collapsed substantially within one another in the retracted position. It can be additionally be seen that the leg 64 in the retracted position is disposed substantially flush with the central frame member 44 and is oriented substantially parallel with the central frame member 44. It is understood that the space in FIG. 6 between the leg 64 and the central frame member 44 is greatly exaggerated for purposes of clarity.

The lock 84 advantageously permits the leg 64 to be lockably and releasably retained in the extended and retracted positions. The lock 84 extends operatively between the second and third members 76 and 80, although it is understood that the lock 84 alternatively could extend operatively between the first and second members 72 and 76 or between the central frame member 44 and either of the first and third members 72 and 80.

The lock 84 includes a shank 108, a pin 120 (FIGS. 8, 8A, and 9), a pair of first notches 128 and a pair of second notches 130 formed on the third member 80, and a biasing device 134. The shank 108 is slidable on the second protruding portion 110 between an engaged position (FIG. 8) and a disengaged position (FIG. 9). The pin 120 is disposed on the shank 108 and is received in a slot 112 formed in the second member 76. The sliding of the pin 120 in the slot 112 therefore defines the movement of the shank 108 between the engaged and disengaged positions.

The shank 108 includes a pair of tabs 124 at one end of the shank 108, with the opposite end of the shank 108 being received in a channel (not shown) formed in the shoe 88A or 88B. The end of the shank 108 is received in the channel of the shoe 88A or 88B when the shank is in the engaged position, with the end of the shank 108 being even further received into the channel of the shoe 88A or 88B when the shank 108 is in the disengaged position (FIG. 9).

Figure 8:
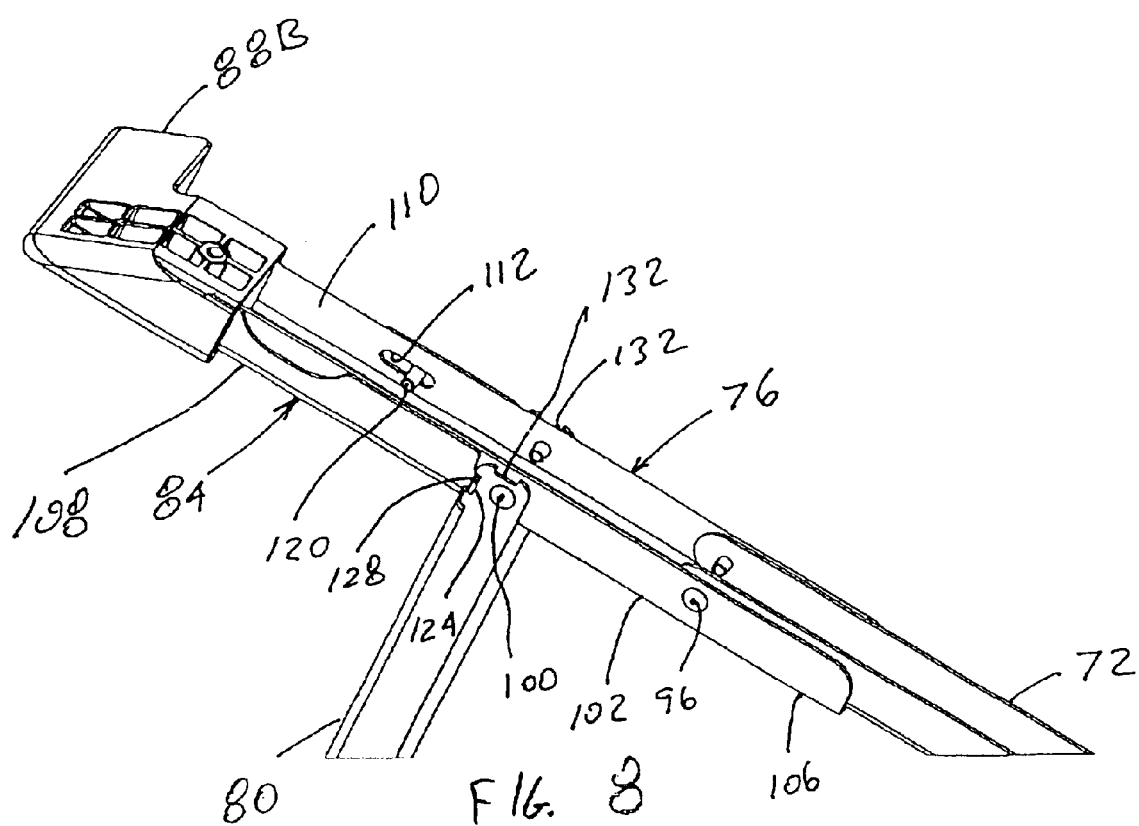
FIG. 8 is a perspective view of a portion of the underside of one of the legs of the wheelbarrow in the extended position and depicting a lock of the leg being in an engaged position.
Figure 9:
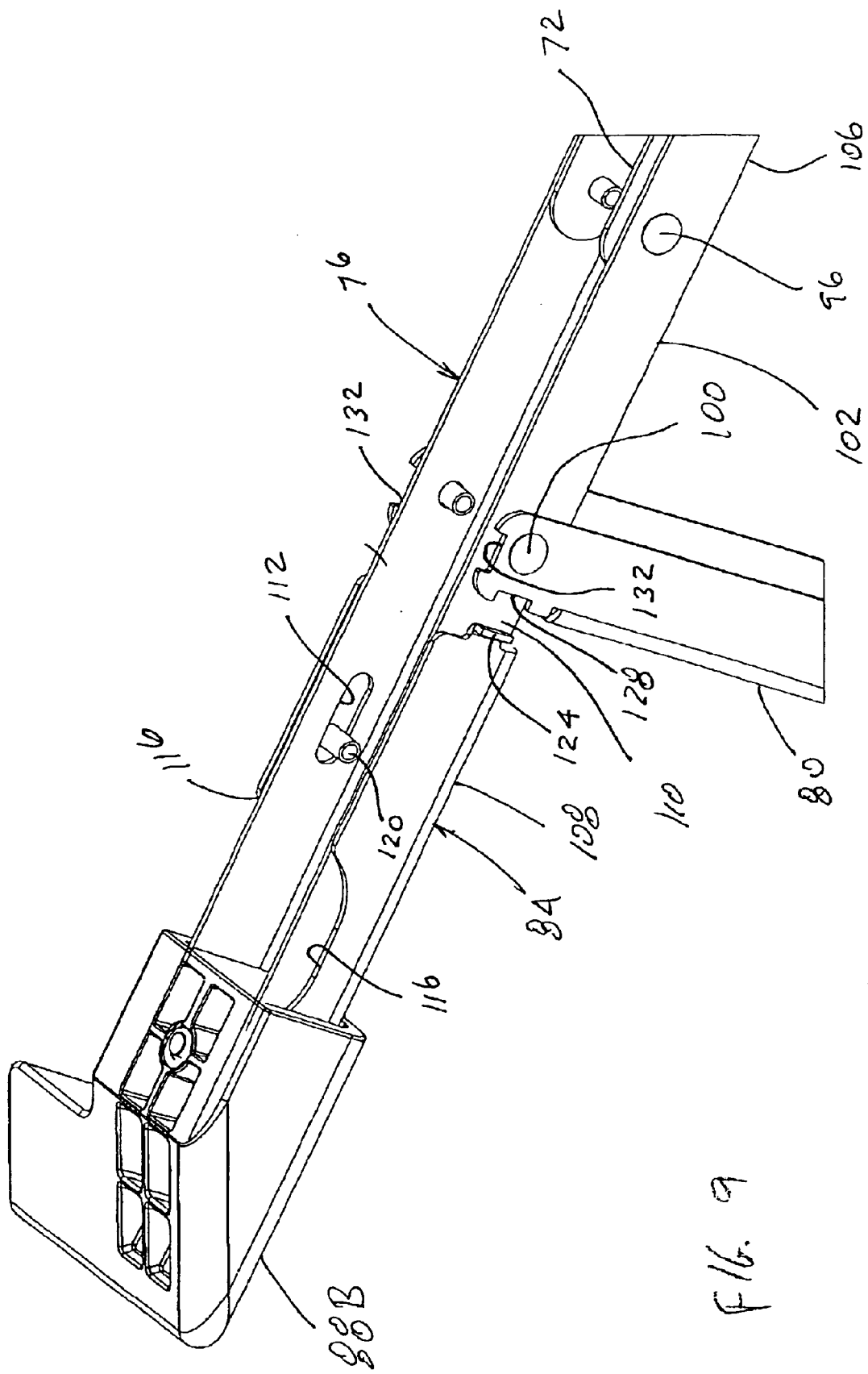
FIG. 9 is a view similar to FIG. 8, except depicting the lock in a disengaged position.
Figure 10:
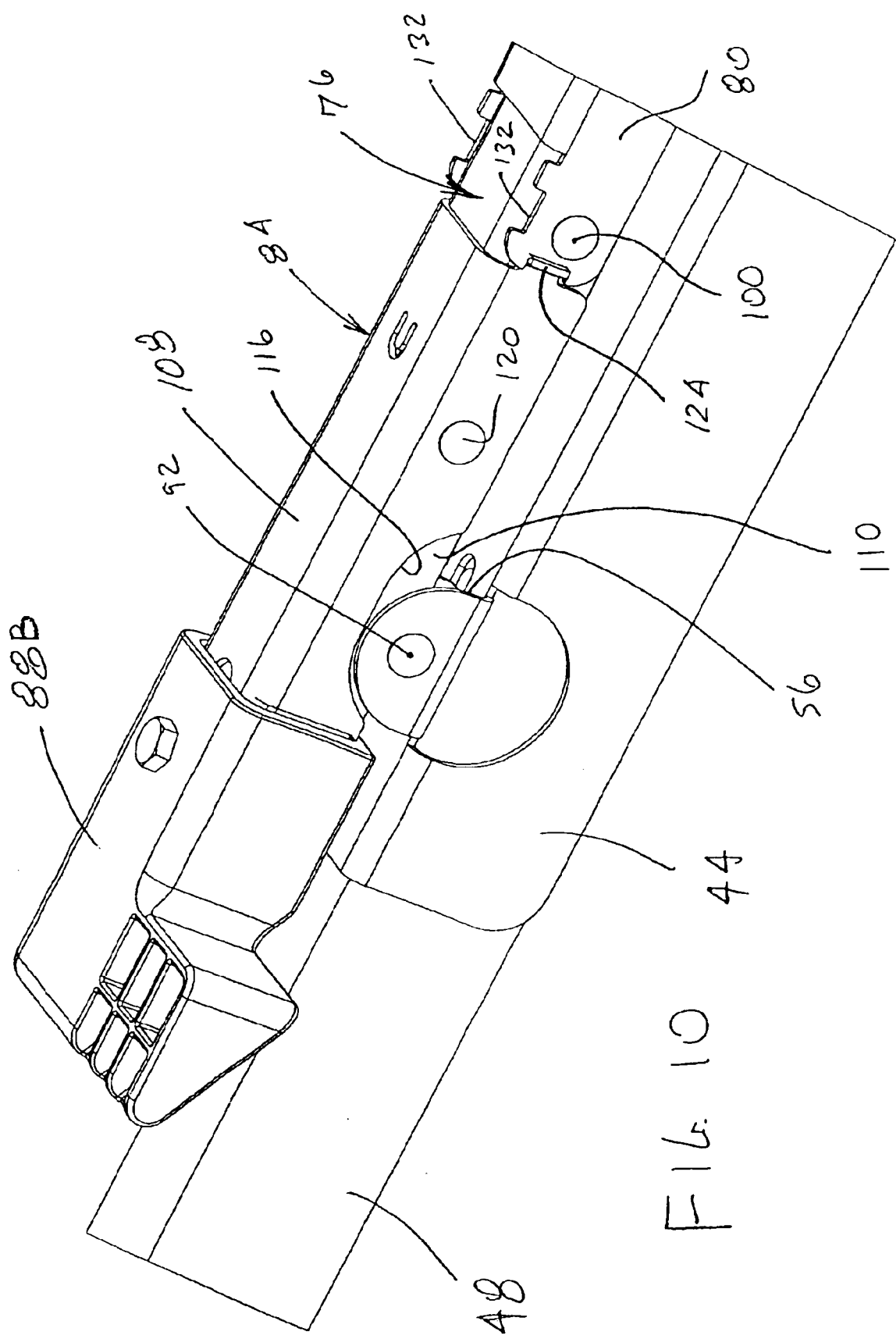
FIG. 10 is a perspective view of the leg in the retracted position and the lock in the engaged position.

The tabs 124 are engaged in the first notches 128 when the shank 108 is in the engaged position and the leg 64 is in the extended position (FIG. 8). The tabs 124 are engaged in the second notches 132 when the shank 108 is in the engaged position and the leg 64 is in the retracted position (FIG. 10). It can be understood that when the tabs 124 are engaged in the first notches 128 (FIG. 8) the leg 64 is locked in the extended position. Similarly, when the tabs 124 are engaged in the second notches 132 (FIG. 10) the leg 64 is locked in the retracted position. The biasing device 134 (FIG. 8A) biases the shank 108 toward the engaged position and is depicted schematically as a helical tension spring extending between a first lip 178 on the lock 84 and a second lip 186 formed on the second member 76, the spring extending through an access way 178 formed in the second member 76, although other biasing structures and methodologies may be employed.

Figure 11:
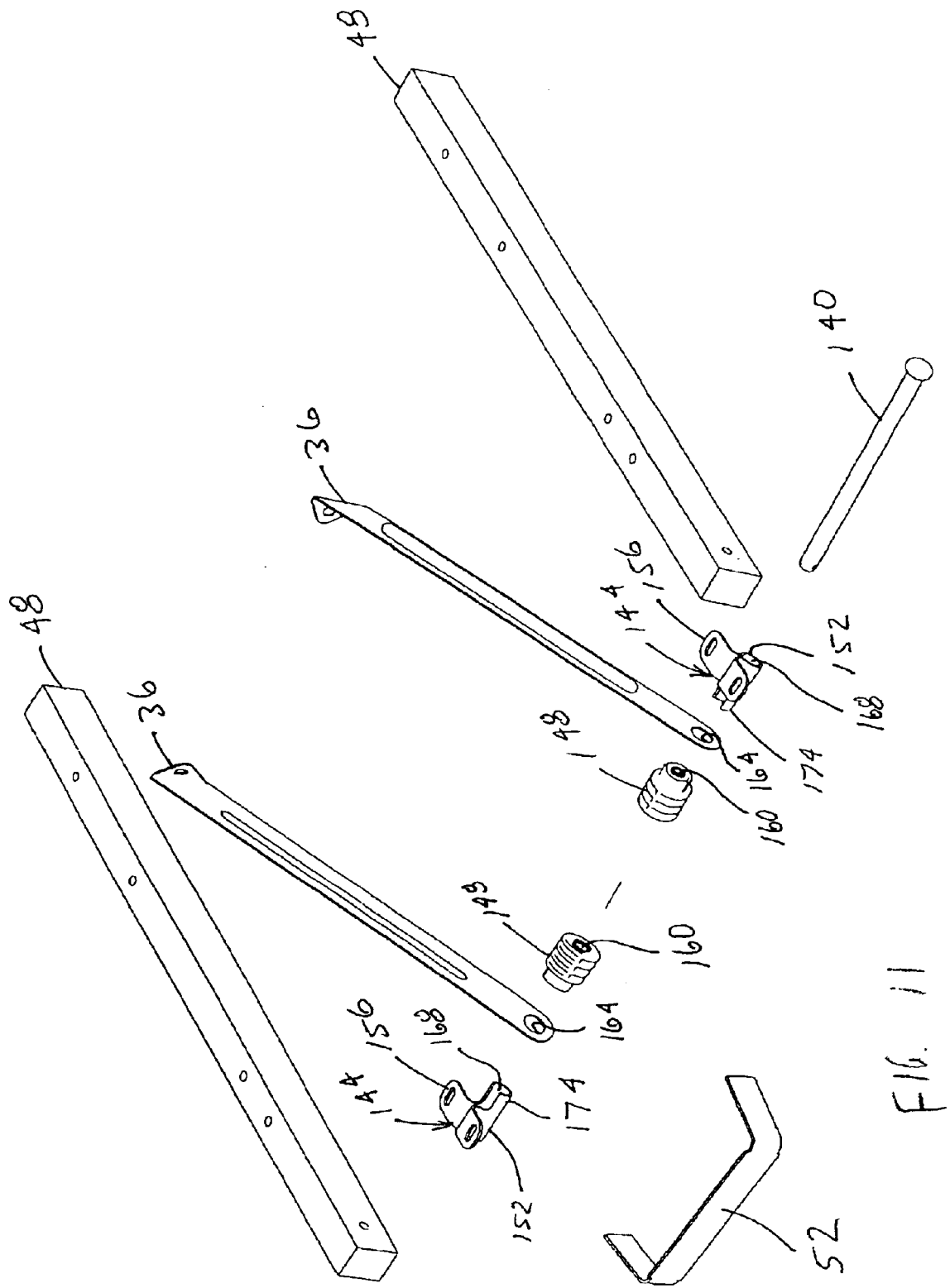
FIG. 11 is an exploded view of a portion of the wheelbarrow.

As can be understood from FIGS. 4 and 11, the axle apparatus 32 includes an axle bracket 136 that is mounted on the frame 24 and an axle 140 that is mounted on the axle bracket 136. The axle bracket 136 includes a pair of end members 144 and a pair of spacers 148, with each end member 144 including a generally cylindrical hub portion 152 and a generally planar flange portion 156 connected with one another. The spacers 148 are substantially cylindrical bodies that are formed with a substantially cylindrical central bore 160 extending therethrough.

It can be seen from FIG. 11 that the tray braces 36 are each formed with a mounting hole 164 at one end thereof. In assembling the axle apparatus 32 and attaching it to the frame 24, a protruding portion 174 of the hub portion 152 of one of the end members 144 is received through the mounting hole 164 of one of the tray braces 36. The protruding portion 174 of the hub portion 152 is then press fit into the central bore 160 of one of the spacers 148 which retains the tray brace 36 interposed substantially between the spacer 148 and the flange portion 156. The other end member 144 and spacer 148 are similarly assembled with the other tray brace 36. The hub portions 152 are then aligned with one another, and the flange portions 156 are mounted to the frontal frame members 48 with appropriate fasteners such as screws or other fasteners. The axle 140 can be received in the openings 168 defined in the hub portions 152.

The wheelbarrow 4 thus described includes a support 28 having a pair of legs 64 that are movable between an extended position and a retracted position and are lockable in both such positions. The legs 64 are each configured to function as four-bar linkages that are collapsible upon themselves to occupy only a minimal region of space when in the retracted position. It is understood that in other embodiments (not shown) of the present invention, the various members of the legs may be of lengths having different proportions to one another and may pivot between the extended and retracted positions in different rotational relationships with respect to one another than the exemplary wheelbarrow 4 depicted in the accompanying figures. It is further understood that it may be desirable in some embodiments (not shown) for one or more of the members of the legs to be detachable from one another.

The wheelbarrow 4 described above is also advantageously configured to be assembled relatively quickly. Specifically, the frame subassembly 8 can be manufactured and delivered to the retailer or the customer in an assembled condition. In order to assemble the wheelbarrow, the axle 140 is removed from the axle bracket 136, and the tray braces 36 are pivoted from their initial position substantially parallel with the frontal frame members 48 to a position substantially perpendicular to the frontal frame members 48. The wheel 12 is aligned with the axle bracket 136 and the axle is received through the hub portions 152 and the wheel 12. The axle 140 may be retained in place by a cotter pin, C-clip or other structure attached to an end of the axle 140. The handles 20 are mounted to the central frame members 44 by receiving a portion of the handles 20 into the central opening of the central frame members 44 adjacent the portion of the frontal frame members 48 received in the central frame members. The handles 20 can be fastened to the central frame members 44 with appropriate fasteners and/or adhesives of known types.

Figure 12:
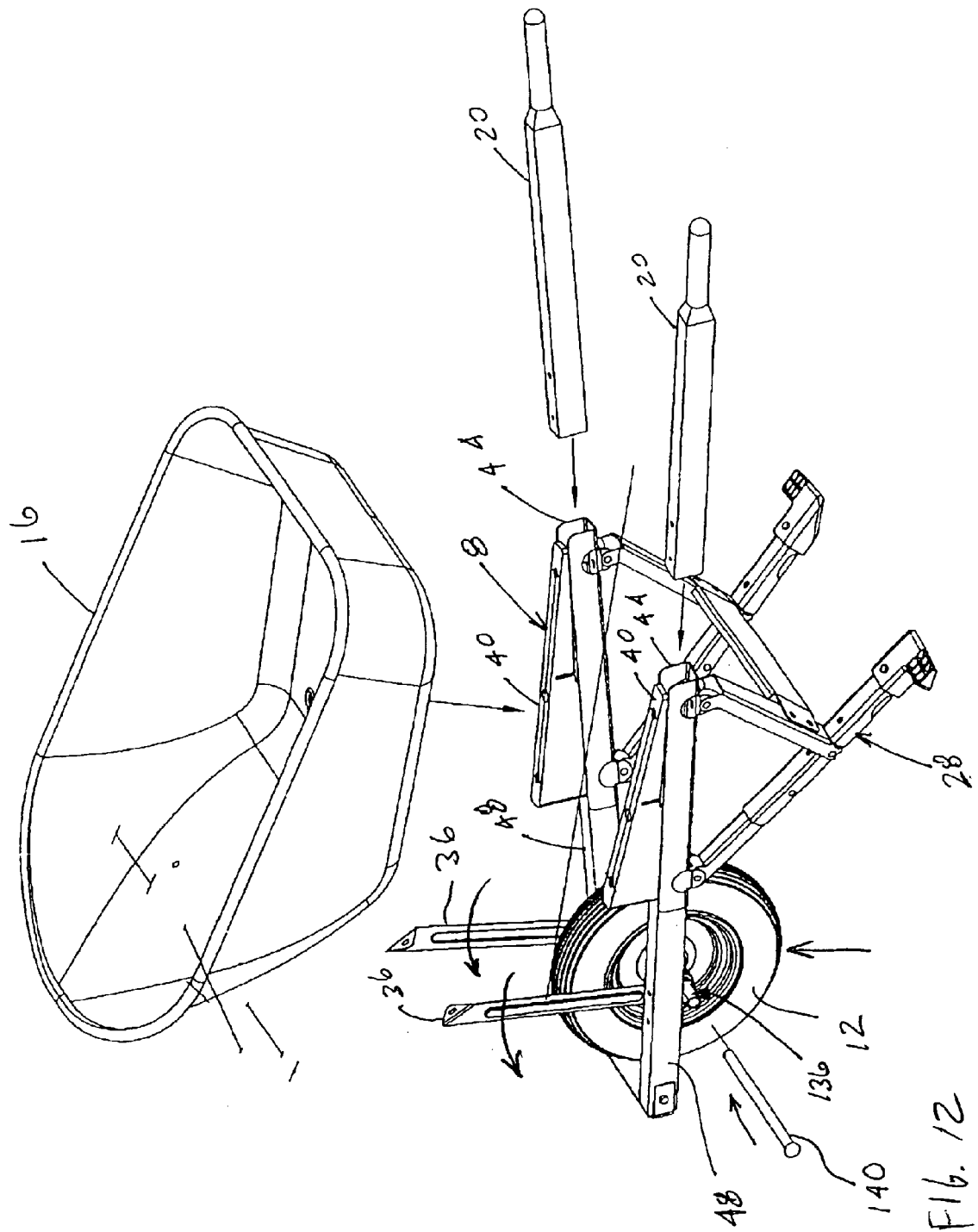
FIG. 12 is an operational view depicting initial assembly of the wheelbarrow.

The tray 16 is then mounted to the frame subassembly 8. The tray 16 is disposed against the risers 40 and is mounted to the central frame members 44 with the use of appropriate fasteners and/or adhesives. Additionally, the tray braces 36 are fastened to the tray 16 with appropriate fasteners. These assembly steps are all indicated generally in FIG. 12.

Essentially, therefore, since the frame subassembly 8 can be delivered in an assembled condition, the wheelbarrow 4 can be assembled by mounting the wheel 12, the tray 16, and the handles 20 to the frame subassembly 8. Such assembly is relatively simple and can be accomplished relatively quickly by unskilled personnel.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A collapsible support for a device, the support being structured to retain the device in a given position with respect to a surface, the support comprising:
   a first member;
   a second member;
   a third member; and
   a lock extending between the second member and one of the first and third members;

the support being movable between an extended position and a retracted position;

the lock releasably resisting movement of the at least first leg from at least one of the extended position and the retracted position in a direction toward the other of the extended position and the retracted position;

the second member being pivotably connected with and pivotable with respect to the first and third members;

the second member being engageable with the surface to retain the device in the given position with respect to the surface when the support is in the extended position;

the first and third members each being structured to be mounted on the device.

2. The support as set forth in claim 1, in which the lock includes a tab and at least a first notch, the tab being removably receivable in the at least first notch, the tab being disposed on one of the second member and the one of the first and third members, the at least first notch being disposed on the other of the second member and the one of the first and third members.

3. The support as Set forth in claim 2, in which the lock includes a shank, one of the tab and the at least first notch being disposed on the shank, the shank being slidable between an engaged position and a disengaged position.

4. The support as set forth in claim 3, in which the shank is biased toward the engaged position.

5. The support as set forth in claim 2, in which the lock includes a second notch, the tab being received in the at least first notch corresponding with the extended position of the support, the tab being received in the second notch corresponding with the retracted position of the support.

6. The support as set forth in claim 1, in which the support is a leg, and in which the device is a wheelbarrow.

7. A device structured to be disposed against a surface, the device comprising:

a frame;

a support mounted on the frame;

the support including a first member, a second member, and a third member;

the first and third members each being pivotably mounted on the frame;

the second member being pivotably connected with and pivotable with respect to each of the first and third members;

the support being movable between an extended position and a retracted position;

the support including a lock that releasably resists movement of the support from at least one of the extended position and the retracted position in a direction toward the other of the extended position and the retracted position; and the second member being engageable with the surface to retain the device in the given position with respect to the surface when the support is in the extended position.

8. The device as set forth in claim 7, in which the first, second, and third members are oriented substantially parallel with at least a portion of the frame when the support is in the retracted position.

9. The device as set forth in claim 7, in which the first, second, and third members are disposed generally flush with the frame when the support is in the retracted position.

10. The device as set forth in claim 7, in which the lock releasably retains the support in at least one of the extended position and the retracted position.

11. The device as set forth in claim 7, in which the lock includes a tab and at least a first notch, the tab being removably receivable in the at least first notch.

12. The device as set forth in claim 11, in which the lock extends between the second member and one of the first and third members, the tab being disposed on one of the second member and the one of the first and third members, the at least first notch being disposed on the other of the second member and the one of the first and third members.

13. The device as set forth in claim 11, in which the lock includes a shank, one of the tab and the at least first notch being disposed on the shank, the shank being slidable between an engaged position and a disengaged position.

14. The device as set forth in claim 13, in which the shank is biased toward the engaged position.

15. The device as set forth in claim 11, in which the lock includes a second notch, the tab being received in the at least first notch corresponding with the extended position of the support, the tab being received in the second notch corresponding with the retracted position of the support.

16. The device as set forth in claim 7, in which the support is a leg, and in which the device is a wheelbarrow.

* * * * *